United States Patent [19]

Nelson

[11] Patent Number: 5,087,824
[45] Date of Patent: Feb. 11, 1992

[54] POWER PLANT FOR GENERATION OF ELECTRICAL POWER AND PNEUMATIC PRESSURE

[76] Inventor: Bill Nelson, 400 N. Frankwood, Sanger, Calif.

[21] Appl. No.: 506,169

[22] Filed: Apr. 9, 1990

[51] Int. Cl.⁵ .................... H02P 9/04; G05D 16/20
[52] U.S. Cl. ................................ 290/1 A; 290/1 R
[58] Field of Search .................. 290/1 R, 1 A, 1 B

[56] References Cited

U.S. PATENT DOCUMENTS

| | | | |
|---|---|---|---|
| 900,522 | 11/1908 | Gravell et al. | 290/1 R |
| 1,027,273 | 5/1912 | Nelson | 290/1 R |
| 1,380,123 | 5/1921 | Sullivan | 290/1 A |
| 1,459,563 | 6/1923 | Thamm | 290/1 R |
| 1,573,883 | 2/1926 | Vining | 290/1 B |
| 2,364,013 | 11/1944 | Waseige | 290/1 A |

Primary Examiner—A. D. Pellinen
Assistant Examiner—Robert L. Hoover
Attorney, Agent, or Firm—Dennis B. Haase

[57] ABSTRACT

A power plant for generating electric power and pneumatic pressure includes an internal combustion engine, an electrical generator, and a compressor and pneumatic supply tanks. Both the electrical generator and the compressor are driven by the engine, however, the engine drive is so coupled and controlled that the engine drives the generator as its primary load, and the compressor as its secondary load and apportions the engine power between these units according to need. When the generator uses all the engine power, pneumatic power is supplied by the pneumatic supply tanks, permitting a smaller than normal drive engine.

A quick start and quick kill mechanism is provided for the engine by using the air supply from the pneumatic supply tank and an air motor, and a time delay shut down relay when no power is being used. Also the generator can be used as an electric drive motor for the compressor in place of the internal combustion engine, where 110 volt power is available on the job site.

9 Claims, 5 Drawing Sheets

POWER PLANT FOR GENERATION OF ELECTRICAL POWER AND PNEUMATIC PRESSURE

DESCRIPTION OF INVENTION

This invention relates generally to power plants, and more particularly power plants for simultaneously providing electrical power and pneumatic pressure.

Such power plants are frequently portable units since the need for both electrical and pneumatic power is common where power driven hand tools are used as in building construction and electricity is not available at the site. Craftsmen on such projects frequently carry a power plant in a pickup truck or van to supply these power sources and size and weight are therefore quite important.

The prior art known to me is represented by the following U.S. Pat. Nos.:

| PATENTEE | U.S. PAT. NO. | ISSUE DATE |
| --- | --- | --- |
| Ishihara | 4,173,951 | Nov. 13, 1979 |
| Waseige | 2,364,013 | Jul. 14, 1942 |

Each of these references discloses the improvement of a single internal combustion engine which drives both a generator and a compressor, thus eliminating the need for a separate engine for each power source unit. The Waseige patent discloses a high speed engine geared down for coupling the power source units in an effort to make the combined apparatus sufficiently light weight for use on aircraft. However, both of these patents disclose driving the power producing units simultaneously thereby requiring a drive engine of sufficient output to handle the double load.

A need exists for a power plant of the type described in which an internal combustion engine can be reduced in size with its output apportioned between the power sources to provide the simultaneous availability of electric and pneumatic power. Such a power plant would be smaller, lighter in weight, and more economical to operate. Also a quick start and quick kill mechanism is needed for the internal combustion engine to save fuel and reduce air pollution and noise when the engine is not in use.

It is a major object of my invention to provide a power plant which fulfills this need.

It is also an important object of my invention to provide a power plant of the type described in which pneumatic reserve tanks are provided to supply pneumatic power when the total drive capacity of the engine is devoted to driving the generator.

It is another object of my invention to provide a control system which directs the engine to drive the compressor when the electrical power required is not sufficient to utilize the entire output of the drive engine, and to use the excess drive power to provide an increase in the pneumatic pressure reserve tanks to supply compressed air tools.

It is a further object of my invention to control my power plant so that the pneumatic pressure reserve tank provides a reserve of sufficient capacity to supply most periods of prolonged simultaneous use of both electric and pneumatic power and thereby permit replenishment of the pneumatic reserve tanks only when the electrical power is not using the total available driving power of the engine.

It is yet another object of my invention to provide a power plant of the type described which automatically starts the drive engine if the air pressure in the reserve tanks falls below 100 pounds per square inch (psi).

It is also a further object of my invention to provide a quick start up and quick kill system for my power plant engine by using the reserve of pneumatic pressure in the pneumatic tank to drive a pneumatic motor to start up the drive engine, and a time delay engine shut down relay when neither electric nor pneumatic power is needed.

It is also an object of my invention to provide a power plant of the type described in which the generator can be converted to use as an electric motor to replace the usual drive engine and drive the compressor alone, when 110 volt A.C. electric power is available at the job site.

It is yet a further object of my invention to reduce the size and weight of a power plant of the type described and thus enhance its portability.

It is yet a further object of my invention to provide a power plant of the type described which is restricted in cost due to the reduced capacity required for the driving engine.

These and other objects and advantages of my invention will be more readily understood from the following detailed description of a preferred embodiment, when read together with the accompanying drawings in which.

DETAILED DESCRIPTION OF PARTS

Figure 1:
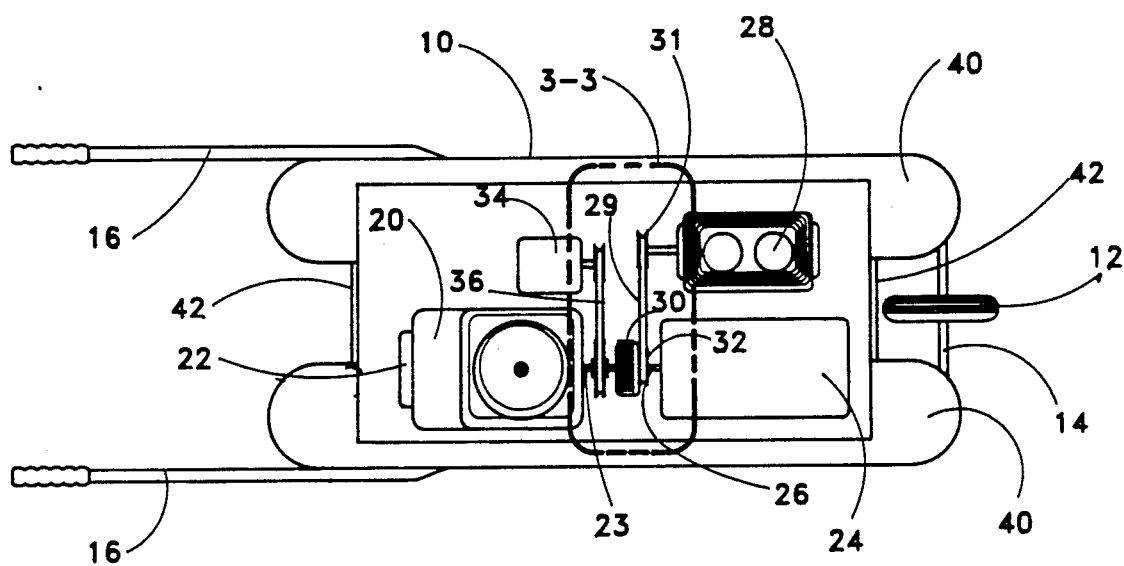
FIG. 1 is a plan view of a preferred embodiment of my invention.
Figure 2:
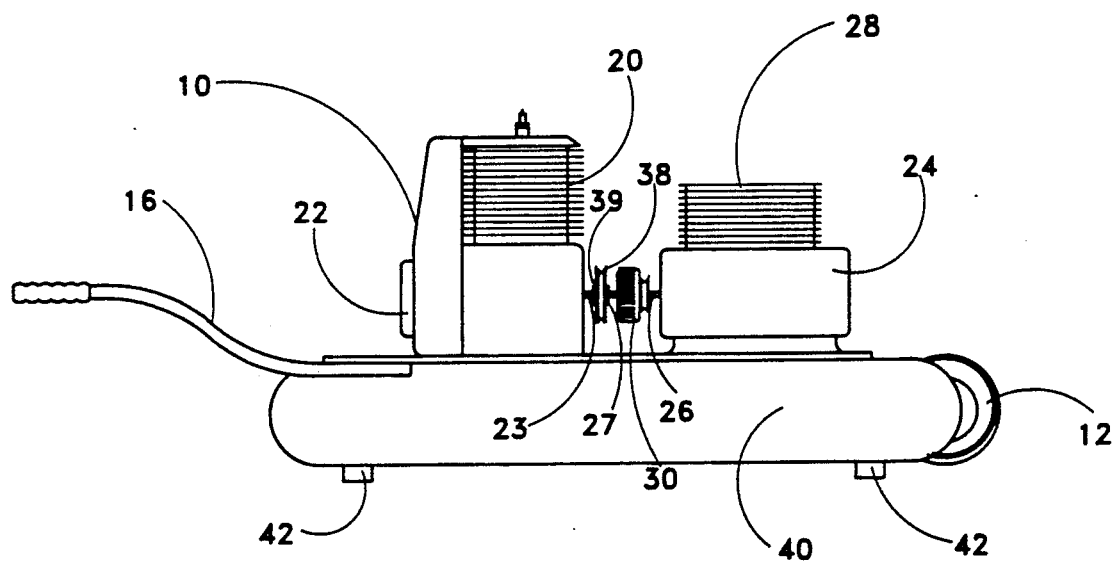
FIG. 2 is a side elevational view of the preferred embodiment of my invention as shown is FIG. 1.

Referring now to these drawings, the numeral 10 designates generally a preferred embodiment of my invention in a form adapted for use by workmen in the building construction industry. The power plant 10 is small enough in size and weight to be easily carried in the bed of a pick-up truck and has a front wheel 12 carried on a front axle 14, and a pair of handles 16 to enhance its portability.

The power plant 10 has a gasoline internal combustion engine 20, with a pull start mechanism 22 and is coupled through its drive shaft 23 with an electric power generator 24. The generator 24 has a drive shaft 26 aligned with and connected to to drive shaft 23 of the drive engine 20 by a centrifugal clutch 30, with the rotor connected to the drive shaft 23 and the drum connected to generator shaft 26.

An air compressor 28 is mounted adjacent the electric power generator 24 and driven from the generator drive shaft 26 and the engine drive shaft 23 through the centrifugal clutch 30. The air compressor 28 is connected to the generator shaft 26 by means of a V-belt 29, the centrifugal clutch 30 and belt pulleys 31 and 32. The V-belt pulley 31 is mounted on the drive shaft of compressor 28 and is larger than the V-belt pulley 32, which attaches to the generator shaft 26 by means of the clutch 30. The larger diameter pulley 31 on the compressor shaft compared to the smaller diameter pulley 32 on the generator, accommodates the speed versus power ratios of the connected units, since the compressor requires a greater drive torque at a slower speed than the generator.

Figure 3:
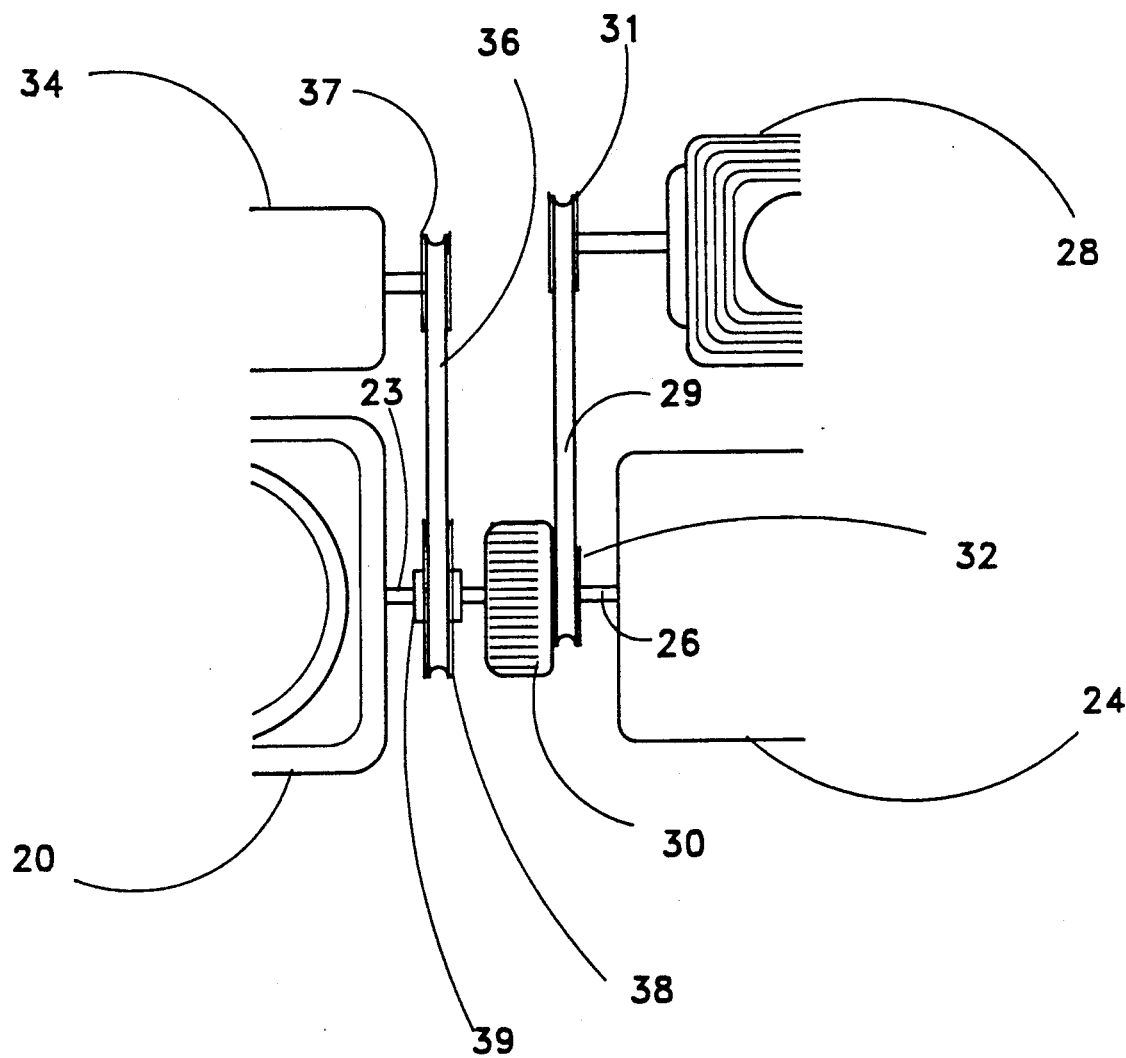
FIG. 3 is a partial, enlarged plan view taken at line 3—3 in FIG. 1 showing the drive couplings and clutch on the motor shaft.

In FIG. 3, the interconnection of the drive engine 20 with the generator 24 and the air compressor 28 through the centrifugal clutch 30 is shown in enlarged detail. This figure also shows the connection of an air driven start motor 34 to the engine shaft 23, to start the engine 20 in place of the pull starter 22. The air driven start motor 34 is connected to the engine shaft 23 by a drive belt 36 through V-belt pulley 37 connected to the start motor 34 and V-belt pulley 38. The V-belt pulley 38 is attached to the engine shaft 23 by a one-way coupling 39 so that the air motor is not driven after the drive engine 20 is started up.

The centrifugal clutch 30 is attached to the engine shaft 23 on one side, and to the shaft 26 of generator 24 on the other side. When the clutch is rotated at a substantial speed by the engine, it engages, in a manner well-known and in the art, and transmits driving power from the engine to the generator. On the other hand, when the clutch is driven from the generator side, it does not engage and the generator becomes an electrical drive motor in the manner hereinafter explained. The engine 20 is therefore not driven when the generator serves as the drive engine for the power plant.

The drive engine 20, generator 24, compressor 28, and air start motor 34, are all mounted on a pair of large elongated pneumatic pressure reserve tanks 40 which are held together by a frame 42 that serves as the base for the entire power plant 10.

Figure 4:
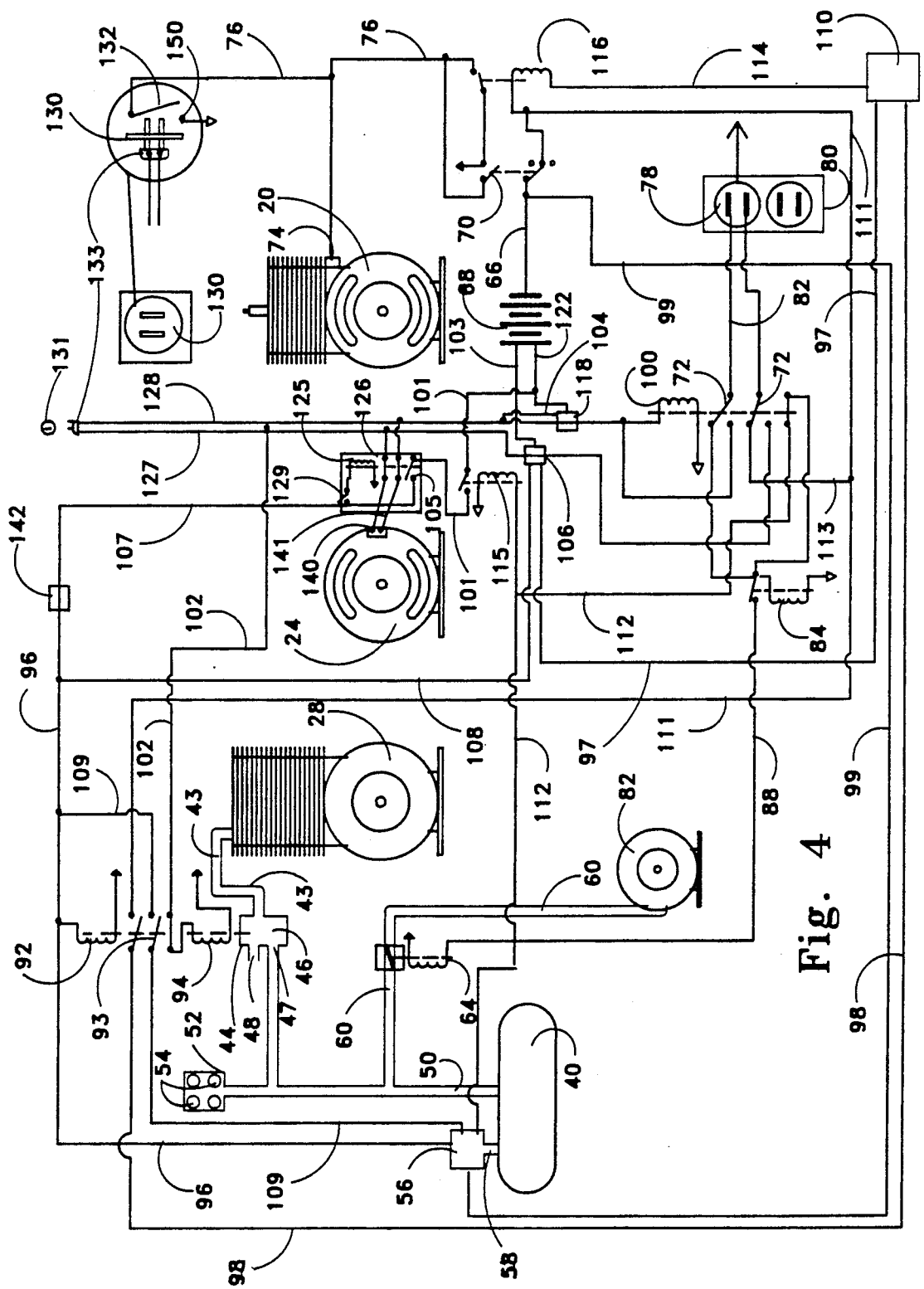
FIG. 4 is a schematic view showing the electrical and pneumatic interconnection between the principal elements of my preferred embodiment.

As best shown in FIG. 4, the pneumatic pressure reserve tanks 40 are connected to the compressor 28 by an output conduit 43 through a control mechanism 44.

The control mechanism 44 includes a solenoid activated compressor load valve 46 connected to the compressor supply conduit 43. The solenoid valve 46 has an air exhaust port 48 and a tank supply port 47, which opens into a conduit 50, and is operable to divert air in the air compressor supply conduit 43 to either the air exhaust port 48 or the air tank supply conduit 50. The air tank supply conduit 50 is connected to the air tanks 40 and has an air output conduit 52 which at its end carries a group of air jacks 54 suitable to connect air hoses from one or more pneumatic tools (not shown) to the pneumatic pressure reserve tanks 40.

An air pressure sensor 56 is connected to the pneumatic pressure reserve tanks 40 by a pressure sensor conduit 58 positioned on one of the air tanks.

A start motor conduit 60 connects the air tank supply conduit 50 to the pneumatic start motor 34 which is drivingly connected to the internal combustion engine 20, as previously explained. A start motor solenoid valve 64 is mounted in the start motor conduit 60 and controls the supply of air from the air tanks 40 to the start motor.

The start motor solenoid valve 64 is activated by a low voltage D.C. power circuit 66 powered by a 12 volt battery 68 (see FIG. 4). The D.C. power circuit 66 has an operator control switch 70, and a circuit isolating switch 72. The operator control switch 70 has an "off" position, an "on" position, and an "automatic" position. The operator control switch 70 is connected to the ignition 74 of the drive engine by an electrical circuit line 76, which is open and ungrounded when the control switch is in its "on" or its "automatic" position. When the control switch 70 is in its "off" position engine ignition 74 is grounded through line 76, to deactivate the drive engine.

When the operator control switch is in its "automatic" position, the D.C. power circuit 66 also connects low voltage D.C. power to each of several electrical outlet plugs 78 on an electrical power output board 80. This is achieved through the isolating switch 72 by electrical circuit lines 111 and 113. When thus connected, the isolating switch 72 activates a start circuit switch 84 upon the closing of any trigger on an electrically powered tool that is plugged into any electrical output plug 78, in the electrical output board 80. The closing of a tool trigger connects the D.C. power circuit 66 to a solenoid of the start circuit switch 84, and this circuit activates a start motor solenoid valve 64 through circuit line 88. Since the start motor solenoid valve 64 controls the delivery of air from the reserve tanks 40 to the start motor 34 via the conduit 60, the start motor 34 turns over the internal combustion engine 20 and, the engine starts.

System Start-Up

When the start motor 34 begins turning over drive engine 20, there is no load on the drive engine because the compressor supply conduit 43 is directed to the exhaust port 48 by the control mechanism 44. Also, the generator 24 is not yet coupled to the drive engine 20 because the centrifugal clutch 30 has not yet engaged.

The compressor load valve 46 is directed to the exhaust port 48 because the generator output is below 100 volts A.C. The compressor load valve 46 has a 12 volt D.C. solenoid 92 and a 110 volt A.C. solenoid 94. As soon as the engine 20 gains speed the centrifugal clutch 30 will engage and rotate the generator 24 which in turn puts high voltage A.C. into the system. At first this voltage is below its rated line voltage of 110 volts A.C., because of the reduced start-up speed of the generator, but it quickly reaches this level.

The electrical output from the generator 24 passes to the electrical output board 80 through generator output lines 140 and 141 and via relay 126, to lines 127 and 128. This activates a 110 volt solenoid coil 100 of the isolating switch 72 and immediately changes the contact points in the switch to isolate the 12 volt power. The isolating switch 72 drops the 12 volt D.C. power circuit 66 from the plugs 78 on the electrical output board 80 and deactivates the solenoid of the start circuit switch 84. When the start circuit switch 84 opens, it deactivates the solenoid of the start motor valve 64 and shuts down the delivery of compressed air from conduit 60 to the start motor 34.

The system is now being driven by the drive engine 20 and the generator 24 is producing 110 volt A.C. electrical power to the electrical power output board 80. At the same time, the compressor 28 is being driven by the drive engine 20 through the generator drive shaft 26 but it requires very little of the engine output power so long as the compressor load valve 46 directs the compressor output in conduit 43 to the exhaust port 48.

Once the generator places approximately 100 volts A.C. on the load valve solenoid 94, by means of circuit line 102, this will activate the load valve 46, and direct the compressed air from the compressor 28 to the reserve tanks 40 via the conduit 50. This will not occur, however, unless the solenoid 92 is deactivated. Otherwise, the compressor will remain in its unloaded condition passing its output to the exhaust port 48.

Top-Off Condition

To keep two air tanks near their maximum pressure during normal operation, the control mechanism 44 and compressor load valve 46 provide a "Top-Off" condition. When the tank pressure reaches 130 psi, the pressure sensor 56 sends a high pressure electrical signal to the low voltage solenoid 92 via circuit line 96. This signal activates solenoid 92 and deactivates the 110 volt A.C. solenoid 94 of the compressor load valve 46. This opens the exhaust port 48 and closes the port to the tank supply conduit 50. When solenoid 92 is activated, besides deactivating the 110 volts A.C. to solenoid 94, it closes a circuit which sends an electrical signal to a delay timer 110 via circuit line 98 which notifies the delay timer that the air tanks are full.

Activation of solenoid 92 also closes a switch which initiates a "Top-Off" condition. Prior to the high pressure signal, (i.e. 130 psi), which is sent to solenoid 92 by sensor 56, a "Top-Off" signal, which originates from sensor 56, whenever the tank pressure is 125 pounds or greater and is sent to the relay contact 93 via circuit line 109. This "Top-Off" signal stays at relay contact 93 until solenoid 92 activates, connecting the signal, via circuit lines 109 and 96, through the solenoid 92 to ground. At this time solenoid 92 will stay activated even though the 130 psi signal on line 96 terminates because tank pressure has fallen to 129 psi or below. This occurs because the pressure sensor 56 is sending the 125 psi electrical signal (the "Top-Off" signal) through line 109. When the tank pressure falls below 125 psi the solenoid 92 will return to its normal deactivated position connecting 110 volts A.C. to coil 94 via circuit line 102.

In other words, the reserve pressure tanks 40 have a high pressure point of 130 psi, but are not refilled until their pressure drops below 125 pounds. Also, the "Top-Off" condition keeps the pressure tanks 40 filled to near capacity while gas engine 20 is running, by utilizing any excess engine capacity available.

If pressure sensor 56 delivers a signal to the 12 volt D.C. solenoid 92 of compressor load valve 46 via circuit line 109 because the tank pressure falls below 125 psi, this signal will connect the solenoid 94 of the compressor load valve 46 to the 110 volt A.C. line 102 and direct the compressor output to the reserve tanks 40.

This condition will continue during normal operations and this "Top-Off" condition will keep the compressor load switch 46 from a fluttering response to minimal variations of tank pressure.

When pneumatic tools connected to the air jacks 54, are used, the tank pressure will, of course,. be lowered, and the compressor will be restarted at 125 psi in an attempt to bring the pressure back to 130 psi. If the pneumatic tool use is minimal the compressor will periodically reestablished the tank pressure at 130 psi and its load on the drive engine 20 occurs as available. If the pneumatic use is medium, the compressor may continue as a load on the drive engine 20 until the use is again reduced, or the electrical load is less. If the pneumatic use is substantial, the tank pressure may be drawn down faster than it can be replaced and may fall considerably below 125 psi. If a substantial pneumatic load is maintained for a considerable period, the tank pressure may fall to 100 psi or less. In this circumstance the compressor will constitute a major portion and possibly the entire load on the engine 20. The compressor load will, of course, be less when the tank pressure is lower since the compressor is pumping against a lower pressure head.

When the power plant is operated in this manner with both the compressor and generator driven by the internal combustion engine 20, the load on the engine will be apportioned between the electrical load and the pneumatic load according to their momentary demands. My system always treats the electrical load as the primary load, since the pneumatic load has the reserve air tanks on which to fall back and the compressor is only operated when the drive engine has more capacity than is needed to generate the required electrical load. If the electrical load is the principal load during a particular period but the combined loads do not exceed the drive engine 20 output, the pneumatic output of the air compressor will be delivered to replenish the tanks. If the tank pressure is at 130 psi, the compressor will be unloaded by exhausting its output into the air through the exhaust port 48.

Over Loaded Condition

If the tank pressure signals a need to increase the combined loads of the generator and the compressor exceed the drive engines' capacity and cause the engine to "lug-down" in an overloaded condition, this will reduce the engine speed. When that occurs, the line voltage from the generator will fall below its normal of 110 volts A.C. as the engine speed is reduced and could quickly reach 100 volts A.C. or below. A voltage sensor 106 is mounted in the generator output circuit and when lug-down occurs it sends a signal in response to this condition. The overload signal is directed to the control mechanism 44 via circuit line 108 and then to line 96 and to the low voltage control solenoid 92 of control mechanism 44. This signal activates the solenoid 92 and deactivates the solenoid 94 which changes the compressor load valve 46 thereby removing the overload on the engine by switching the compressor load valve 46 from the conduit 50 to the exhaust port 48. This unloading of the compressor is normally sufficient to permit the drive engine 20 to bring the generator back to speed. When the generator output reaches 110 volts A.C. or above, the overload signal delivered to the control mechanism 44 is cancelled.

Shut Down

If the generator 24 is not subjected to any electrical load and the tanks 40 are at 130 psi there will be no load on the power plant drive engine 20. These conditions will result in pressure sensor 56 sending a shut down signal to the delay timer 110 via circuit line 98, as it normally does when the tanks are at high pressure. This signal will normally be cancelled by a signal from the voltage sensor 106 when the generator has a load. However, where there is no load on the generator, the signal from the pressure sensor 56 will not be impeded by any signal from the voltage sensor 106 since none will occur and therefore after a 10 second interval, the delay timer 110 will activate a shut down solenoid 116 in the operators control switch 70. When this occurs, the system will shut down and remain inactive until a new demand for electric or pneumatic power is made. Upon deactivation of the shut down solenoid 116, the solenoid will drop back to its automatic position in the operators control switch 70, so the system is ready to start up the system again upon demand.

If during the 10 second period of the delay timer 110, the electrical load is started again, the voltage sensor 106 will signal this condition to the delay timer via circuit line 97 and cancel the shut down signal. If the tank pressure falls below 125 psi the shut off signal from the air pressure sensor 56 to the delay timer 110 will be cancelled, since operation of compressor is needed.

Engine ReStart

After the engine is shut down, it may be restarted again as long as the operators control switch 70 is on "Automatic". Normally, this will be occasioned by someone pressing the trigger on an electrical tool connected to a plug 78 which will activate the air start up motor 34 through the low voltage circuit 66 and start circuit switch 84, and will restart the power plant. Also, if the tank pressure drops below 100 psi, while the power plant is shut down, the air pressure sensor 56 will cause the system to be restarted through the circuit isolating switch 72 by means of circuit line 112.

This low pressure start up signal from the air pressure sensor 56 is generated by D.C. voltage power delivered directly from the D.C. battery 68 via circuit line 99. The low pressure start up signal is transmitted to one contact point of the isolating switch 72 and on to the solenoid of the start circuit switch 84. It is also transmitted to the solenoid of switch 115 which delivers D.C. volt from the D.C. power circuit 66 to the motor/generator conversion switch 126, explained later.

Battery Recharge

To recharge the D.C. 12 volt battery 68 of the low voltage power circuit 66, a transformer 118 is provided which receives 110 volts A.C. from the generator 24 via circuit line 128 and reduces and rectifies it to a 12 volt D.C. trickle charge which connects to the battery via circuit line 122.

Motor/Generator

To utilize an alternate source of electricity when it is available on the the job site, I have also provided a system which allows the generator 24 to be converted into an electric motor which will then become an electric drive motor for the compressor. To utilize the available electricity the operators control switch 70 is placed in its "off" position, and the electric cord 133 is removed from outlet socket 130. When this is done, connector 132 will ground out the ignition 74 of the drive engine 20 means by ground 150 through electric circuit line 76. Plug 133 in electric cord is inserted in an incoming 110 volt A.C. electric socket 131. At this time, there will be 110 volts A.C. electricity on lines 127 and 128. Line 128 will activate transformer 118 by circuit line 104. In turn, the transformer 118 will charge the 12 volt D.C. battery 68 following rectification. Also, line 128 will then activate coil 100 causing the circuit isolating switch 72 to change to its 110 volt A.C. (high voltage) position. This will place 110 volt A.C. on outlet plug 78. Conversion switch 126, which is attached to generator 74, will now cause the generator to act as an electric drive motor. At the top of conversion switch 126 is a manually operable switch lever 129. The switch lever 129 has two positions, one marked "generator" for the generation of electricity, the other marked "electric motor" to receive electricity. When the switch lever 129 is in the "electric motor" position, lines 127 and 128 are transferring electricity to electric motor through lines 140 and 141 via the conversion switch 126. When power is so applied the electric motor starts turning the air compressor 28 which pumps air into tanks 40 by methods already described. The air pressure sensor 56 is receiving 12 volts D.C. from the battery 68 through line 99. When pressure in the tanks 40 reachs 130 psi the air pressure sensor 56 sends a signal through the circuit line 96 which is received by solenoid 92 and opens the exhaust port 48 to the atmosphere, as previously described. The circuit line 96 also continues this signal to second delay timer, 142 which will delay the signal for two seconds. Then the signal is sent on through the second delay timer 142 to the switch lever 129 by line 107. The switch lever 129 is in its "electric motor" position, which allows the D.C. current from the air pressure sensor 56 to activate a solenoid 125 that drives the conversion switch 126 downward breaking the electrical current to the drive motor/generator 24. When conversion switch 126 moves downward a contact point 105 will carry low voltage to solenoid 125. This will keep the conversion switch 126 activated until air pressure in air tanks 40 drops below 100 psi. At that point, electric motor/generator 24 is shut down and air compressor 28 stops turning. As air is used from the tank, and the pressure falls below 100 psi air pressure sensor 56 will send a low pressure signal through line 112 which activates solenoid 115 opening the switch and terminating the 12 volt D.C. flow of electricity to solenoid 125. When this happens conversion switch 126 delivers 110 volts A.C. to lines 140 and 141 restarting electric motor/generator 24.

Another important feature and function of the electric motor/generator circuitry is as follows: If the electrical power from outlet plug 131 falls below 100 volts A.C. because of other electrical tools being used through electrical output board 80, the voltage sensor 106 will signal this voltage drop through circuit line 108 and circuit line 96 on to the low voltage solenoid 92. Activating solenoid 92, deactivates solenoid 94 and opens the air exhaust port 48. When the air exhaust port 48 opens, it takes the load off of air compressor 28. This is turn will cause electric motor/generator 24 to "free wheel", that is operate without a load. When the motor/generator is "free wheeling" it will draw less current thereby allowing more electrical current to pass through outlet plug 78 and into power tools. In this condition, the voltage sensor 106 will send a D.C. signal to the second delay timer 142. If the voltage on the circuit line 127 does not increase up to 110 volts A.C. within two seconds after the second delay timer 142 receives its signal, the signal will pass on to and activate the solenoid 125, removing the power to the electric motor/generator. This condition will exist until the line voltage returns to 110 volts A.C. or more.

Alternate Reed Head Compressor Regulator Valve

Figure 5:
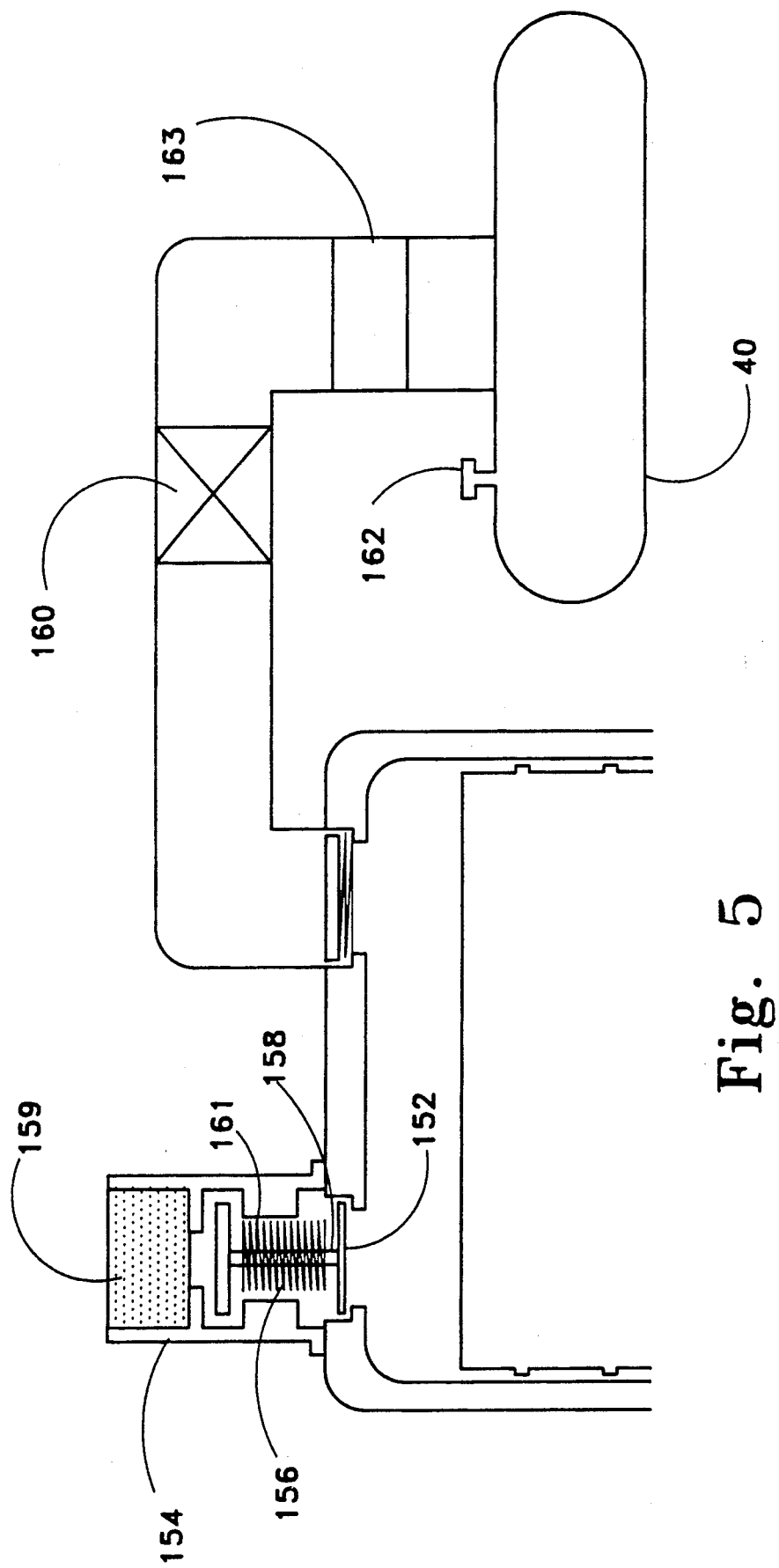
FIG. 5 is a side elevational view of an alternative means of by-passing the compressor output to the atmosphere.

In reed head compressors, an exposed intake valve is mounted in the compressor head. As best shown in FIG. 5, I provide an alternative compressor by-pass and relief valve mechanism 152, which is considerably simpler than the combined electrical control circuit and solenoid valve, just described.

My alternate valve mechanism 152 has a housing 154 which attaches to the compressor head on top of the exposed intake valve. A solenoid 156 is mounted in the housing 154 and has a plunger 158 disposed above but aligned with the intake valve. An air filter 159 is provided above the plunger 158. When a substantial electrical load is placed on the generator, the solenoid 156 is activated and drives the plunger downward onto the valve mechanism 152 to hold the valve open. This opens the compressor head and unloads the compressor. To prevent the leakage back of air from the reserve air tanks 40 through the compressor head and out through to open intake valve, I provide a standard one-way check valve 160, well-known in the industry. I also provide a standard type mechanical pressure relief valve 162 to relieve any excessive pressure in the pneumatic system. In addition I provide a second coil 161 about the solenoid 156 which activates the solenoid when the tank pressure reaches its upper capacity, to vent the compressor head pressure. The second coil 161 is activated by a pressure sensitive relay 163 through electrical circuit lines, (not shown).

Supercharger

In small gasoline engines of the type normally used to drive my pneumatic-electric power plant, a speed governor can be used to adjust the engine throttle to the power load. When the load is minimal, the throttle is closed down to near idle and as the load increases the throttle is opened to increase the engine speed and power output. If the load on the drive engine 20 reaches an amount which exceeds the engine capacity, which in my power plant only occurs when the combination of the electrical and pneumatic loads becomes excessive, the engine will lug-down and the fuel mixture will become overly rich causing black smoke to be emitted from the exhaust and the engine to finally stall. This "lug down" and stall condition can be relieved by a supercharger mechanism which increases the air supply to the engine to correct the overly rich mixture. Typical superchargers are turbo type air pumps driven by the engine to supply air at greater than atmospheric pressure. By using the pneumatic pressure in the reserve tanks, I have devised a more effective and economical supercharger mechanism for my power plant.

Figure 6:
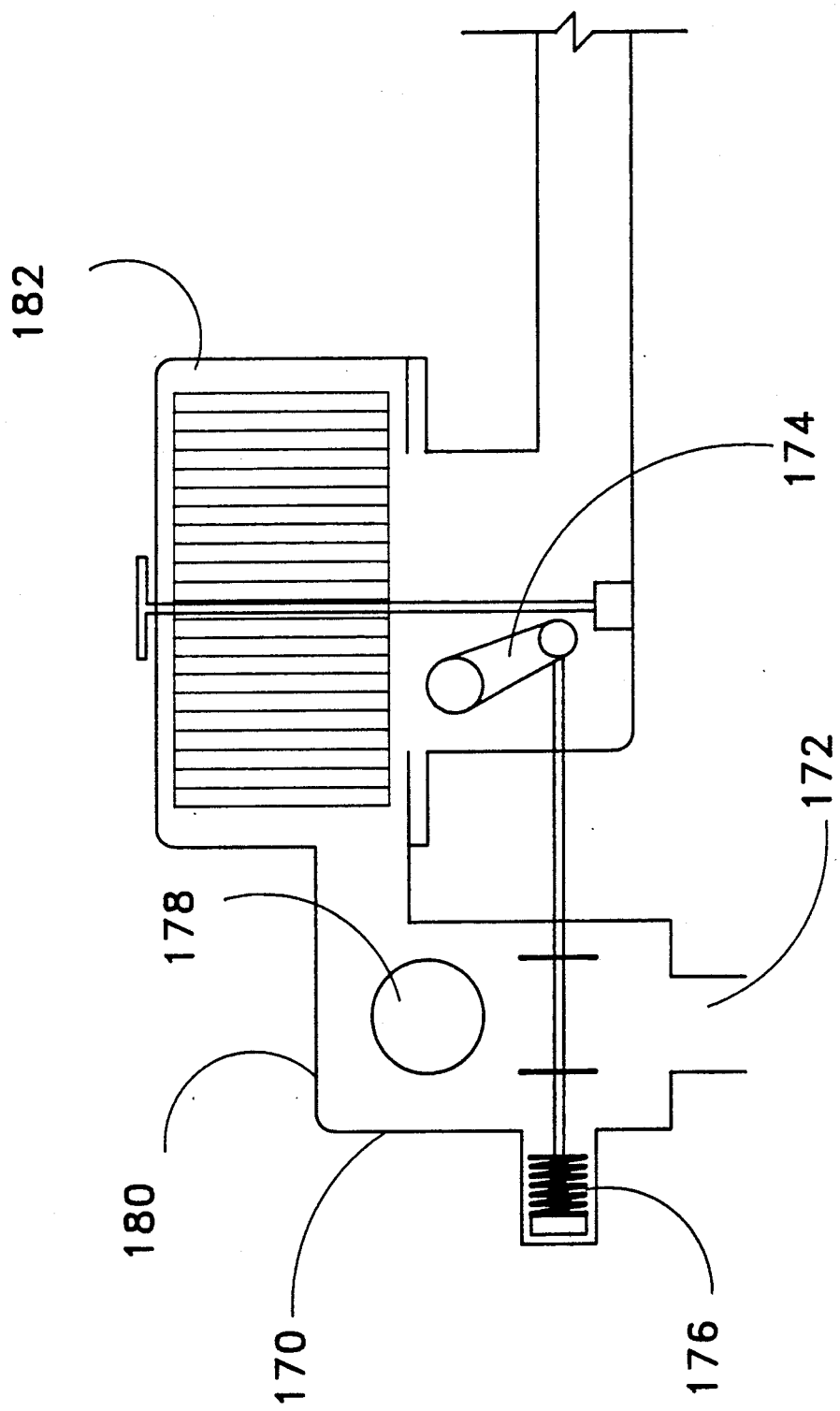
FIG. 6 is an alternative mechanism for supercharging the power plant drive engine by using the pneumatic reserve.

As best seen in FIG. 6, I provide a supercharger mechanism 170 which is activated by an overload on the drive engine output, to bleed pressurized air from the pneumatic pressure reserve tanks 40 into the engine air intake 172. My supercharger mechanism 170 is mounted on the carburetor air intake and attached to an adjustable fuel mixture jet 174. It is controlled by an electrically actuated solenoid 176 which, when activated, switches the engine air intake from an atmospheric air intake port 178 to a pressurized air intake port 180. The pressurized air intake port 180 is connected to the pneumatic pressure reserve tanks 40, via an air regulator 182 which reduces air pressure to about two pounds per square inch over atmospheric pressure. The control solenoid 176 is energized by an electrical power relay 186 when the electrical power circuit shows a lug-down condition in the drive engine.

When excessive drive engine load is sensed by the electrical power relay 186, the supercharger solenoid 176 is energized, switching the engine intake air from the atmospheric air intake port 178 to the pressurized air intake port 180, and the adjustable fuel mixture jet 174 is enriched beyond the normal setting. The pressurized air and additional fuel from the increased enrichment jet result in a supercharged fuel mixture which increases the engine horsepower to accommodate the excess drive engine load. Since such excessive electrical loads are frequently caused by the simultaneous starting of several electrical tools at once, it normally only occurs at random and for short periods. By utilizing the available supply of pressurized air from the storage tank, I am able to supercharge the engine to overcome engine shut down during such events and provide a versatile power system with a minimized drive engine capacity.

Pneumatic power is drawn from the pneumatic pressure reserve tanks 40 by pneumatic power lines 52 which are connected to pneumatically driven hand tools. Electrical power is connected to electrically driven hand tools through an electrical output power board 80, which includes overload relays.

From this detailed description of preferred embodiments of my invention it should be understood that it is a very versatile, economical apparatus for providing both electrical and pneumatic power and is fully capable of achieving the objects and providing the advantage heretofore attributed to it.

I claim:

1. In a power plant for concurrently or selectively providing electrical power and pneumatic pressure to an end use, comprising, in combination, a free standing low output internal combustion drive engine having a power output shaft; an A.C. electrical power system, said electrical power system including an electrical generator having an input shaft, and an electrical output circuit; and clutch means interconnecting said power output shaft, and said input shaft;

and a pneumatic power system, said pneumatic power system including a pneumatic compressor disposed adjacent to said generator, and drivingly interconnected therewith such that rotation of said input shaft also drives said compressor; said compressor having a pressure output line interconnected with, and adopted to charge at least one storage tank;

control means interconnecting said generator, and said compressor, and including sensor means for measuring electrical demand on said electrical output circuit, and including pressure sensor relief means for diminishing the load on the drive engine by relieving the demand thereon by the compressor to thereby permit the generator to operate at full capacity.

2. The apparatus of claim 1, wherein the said control means prioritizes electrical demand by varying available pneumatic pressure from said pneumatic power system.

3. The apparatus of claim 2, wherein the said means for relieving the load on the drive engine is responsive to said control means, and comprises a pressure relief valve disposed on said compressor for discharging the output of said compressor to atmosphere rather than to said storage tank, at times when the combined demand of said generator and said compressor exceed the output of the drive motor to thereby permit said generator to be operated at optimum capacity.

4. The apparatus as set forth in claim 3, wherein said sensor means is interconnected with, and measures voltage at the output of the generator, said control means being responsive to a signal from said sensor means to actuate said relief valve to discharge the output thereof to atmosphere, when voltage output drops below a predetermined value, and to deactuate said relief valve when the measured voltage exceeds a predetermined value.

5. The apparatus as set forth in claim 4, wherein the value of the voltage which deactuates said relief valve exceeds the voltage necessary to actuate said relief valve by a preset amount.

6. The apparatus as set forth in claim 1, wherein said compressor is equipped with reed-type intake valve, and said pressure sensor relief means includes a solenoid for holding said intake valve in an open position to thereby unload said compressor when the demand on said generator exceeds a predetermined level, and further including means responsive to pressure in said storage tank to hold said reed valve open when the pressure in said tank achieves a predetermined value.

7. The apparatus as set forth in claim 1, wherein means defining a generator switch is interconnected between the output side of said generator and an external source of alternating current electricity, to permit selective operation of the generator from said external source, and switch means for isolating said control means from said external source, whereby said generator becomes a motor to directly drive said compressor.

8. The apparatus as set forth in claim 7, wherein said clutch comprises a one way clutch which is engaged when the torque on said output shaft exceeds the torque on said input shaft, and idles when the torques are reversed, such that when said generator functions as a motor, no power is transmitted to said output shaft of said drive motor.

9. The apparatus of claim 7, wherein said pneumatic power system includes pressure sensor means for determining pneumatic pressure being delivered by said compressor to said tank, said pressure sensing means being interconnected with said external source of power to said generator when said generator is functioning as a motor to disconnect said external power source when a predetermined pressure is achieved; valve means for relieving pressure at said compressor, and time delay means as part of said pressure sensor means, said time delay means being operable to open said valve means for a predetermined time prior disconnecting said external power source, to thereby stabilize pressure in said tank at a desired level.

* * * * *